United States Patent [19]
Petrovich et al.

[11] Patent Number: 5,315,874
[45] Date of Patent: May 31, 1994

[54] MONOLITHIC QUARTZ RESONATOR ACCELEROMETER

[75] Inventors: Anthony Petrovich, Tewksbury; Marc S. Weinberg, Needham; John R. Williams, Lexington, all of Mass.

[73] Assignee: The Charles Stark Draper Laboratories, Cambridge, Mass.

[21] Appl. No.: 316,873

[22] Filed: Feb. 28, 1989

[51] Int. Cl.$^5$ .................. H01L 21/306; H01L 41/00
[52] U.S. Cl. .................. 73/493; 73/517 AV; 73/488; 367/165; 367/173; 310/348
[58] Field of Search .......... 310/329, 348, 361; 367/165, 173; 381/205; 73/488, 493, 517 AV

[56] References Cited

U.S. PATENT DOCUMENTS

| | | | |
|---|---|---|---|
| 4,670,092 | 6/1987 | Motamedi | 73/720 |
| 4,804,875 | 2/1989 | Albert | 310/321 |
| 4,851,080 | 7/1989 | Howe et al. | 73/517 AV |

Primary Examiner—Nelson Moskowitz
Attorney, Agent, or Firm—Joseph S. Iandiorio

[57] ABSTRACT

A monolithic quartz resonator accelerometer including a monolithic quartz sensing structure with a frame, a proof mass support structure within the frame, and a resonator structure interconnecting the frame and the support structure. Further included are a proof mass fixed to the support structure, and electrodes on the resonator structure for driving the resonator at a vibration frequency which varies as a function of the acceleration of the proof mass.

21 Claims, 4 Drawing Sheets

MONOLITHIC QUARTZ RESONATOR ACCELEROMETER

FIELD OF INVENTION

This invention relates to a monolithic quartz resonator accelerometer and more particularly to an accelerometer with its active elements formed in a single monolithic quartz wafer.

BACKGROUND OF INVENTION

Inertial guidance systems require accelerometers capable of accurately measuring the magnitude and direction of acceleration. Typically, the accelerometers must have a dynamic range of $10^5$ gravities or more, be rugged enough to withstand the hostile environment, and be small and lightweight.

In attempts to meet the needs for accuracy and dynamic range, accelerometers having quartz resonator elements have been developed. See, for example, U.S. Pat. Nos. 3,479,536 and 3,238,789, incorporated herein by reference. In those devices, the quartz resonator is rigidly attached to a separate supporting structure at one end and a separate proof mass at the other. Typically, only the resonator is quartz.

Although the accelerometers with quartz resonators may have the desired dynamic range and stability, they are typically extremely difficult to manufacture and very costly. These problems are primarily directly attributable to the manner in which the quartz resonator is configured. The resonator must be physically coupled to the other elements of the accelerometer, which may be constructed of materials having a different coefficient of thermal expansion than the quartz resonator material. Without intricately machined components, as the accelerometer undergoes temperature changes, the resonator may experience additional loading not attributable to acceleration, leading to erroneous readings. That loading would exist even if the accelerometer included separate temperature sensors for compensating the acceleration reading.

In order to meet the accuracy requirements, the separate accelerometer components must be fabricated with high dimensional precision and assembled with the same degree of precision, all at great expense. The number and type of components also increases the size and weight of the accelerometer, which is undesirable in a missile guidance system. The very fact that a large number of separate parts is employed also affects the ruggedness of the accelerometer.

SUMMARY OF INVENTION

It is therefore an object of this invention to provide a monolithic quartz resonator accelerometer which is extremely accurate and reliable.

It is a further object of this invention to provide a monolithic quartz resonator accelerometer which is extremely insensitive to temperature changes.

It is a further object of this invention to provide a monolithic quartz resonator accelerometer which is inexpensive to manufacture.

It is a further object of this invention to provide a monolithic quartz resonator accelerometer which is lightweight, small and rugged.

It is a further object of this invention to provide a monolithic quartz resonator accelerometer which has few parts.

It is a further object of this invention to provide a monolithic quartz resonator accelerometer in which the accelerometer elements are entirely quartz.

It is a further object of this invention to provide a monolithic quartz resonator accelerometer in which the accelerometer elements all have the same crystallographic orientation.

This invention results from the realization that quartz resonator accelerometers can be dramatically simplified and improved by fabricating the active accelerometer elements in a single quartz wafer.

This invention features a monolithic quartz resonator accelerometer with a monolithic quartz sensing structure. The sensing structure includes a frame, a proof mass support structure within the frame, and a resonator structure interconnecting the frame and the support structure. The accelerometer further includes a proof mass fixed to the support structure, and electrodes on the resonator structure for driving the resonator at a vibration frequency which varies as a function of the acceleration of the proof mass. The accelerometer may further include quartz support means for securing the sensing structure. That support means may include two support plates encompassing the frame. Preferably, the support plates are fixed to the frame. The support plates may includes means for clamping the resonator structure proximate the support structure. Preferably, the quartz support means has the same crystallographic orientation as the monolithic quartz sensing structure so that the entire accelerometer is in effect formed from a single quartz crystal. That orientation is preferably less than 10 degrees from the Z axis.

The accelerometer may further include means for energizing the electrodes to vibrate the resonator structure. The means for energizing preferably includes means for establishing the vibration frequency of the resonator. Further included may be means, responsive to the means for establishing the vibration frequency, for determining the acceleration of the proof mass. That may be accomplished by including means for calculating the change in vibration frequency of the resonator as the proof mass is accelerated.

The resonator structure may include two resonator elements aligned along a common longitudinal axis. The resonator structure is preferably an elongated beam member; either single beam or double tuning fork structures. Preferably, the proof mass includes a quartz member having the same crystallographic orientation as the sensing structure.

The accelerometer may also include means for sensing the temperature of the quartz sensing structure. Preferably, the temperature sensor is integral with the sensing structure itself. The temperature sensor may include a temperature sensitive resonator structure and means for vibrating the structure. In that case, there is preferably further included means for resolving the vibration frequency of the temperature-sensitive resonator structure. The means for determining the acceleration of the proof mass may then be responsive to the means for resolving the vibration frequency of the temperature-sensitive resonator structure for determining a temperature-corrected acceleration.

DISCLOSURE OF PREFERRED EMBODIMENT

Other objects, features and advantages will occur from the following description of a preferred embodiment and the accompanying drawings, in which.

The monolithic quartz resonator accelerometer according to this invention may be accomplished in a monolithic quartz sensing structure having a frame, a proof mass support structure within the frame and a resonator structure interconnecting the frame and the support structure. The accelerometer further includes a proof mass fixed to the support structure and electrodes on the resonator structure for driving the resonator at a vibration frequency that varies as a function of the acceleration of the proof mass. The accelerometer thus has all of its active elements in a single monolithic quartz wafer, resulting in an accelerometer which is highly accurate, virtually unaffected by temperature changes, small and lightweight.

Figure 1A:
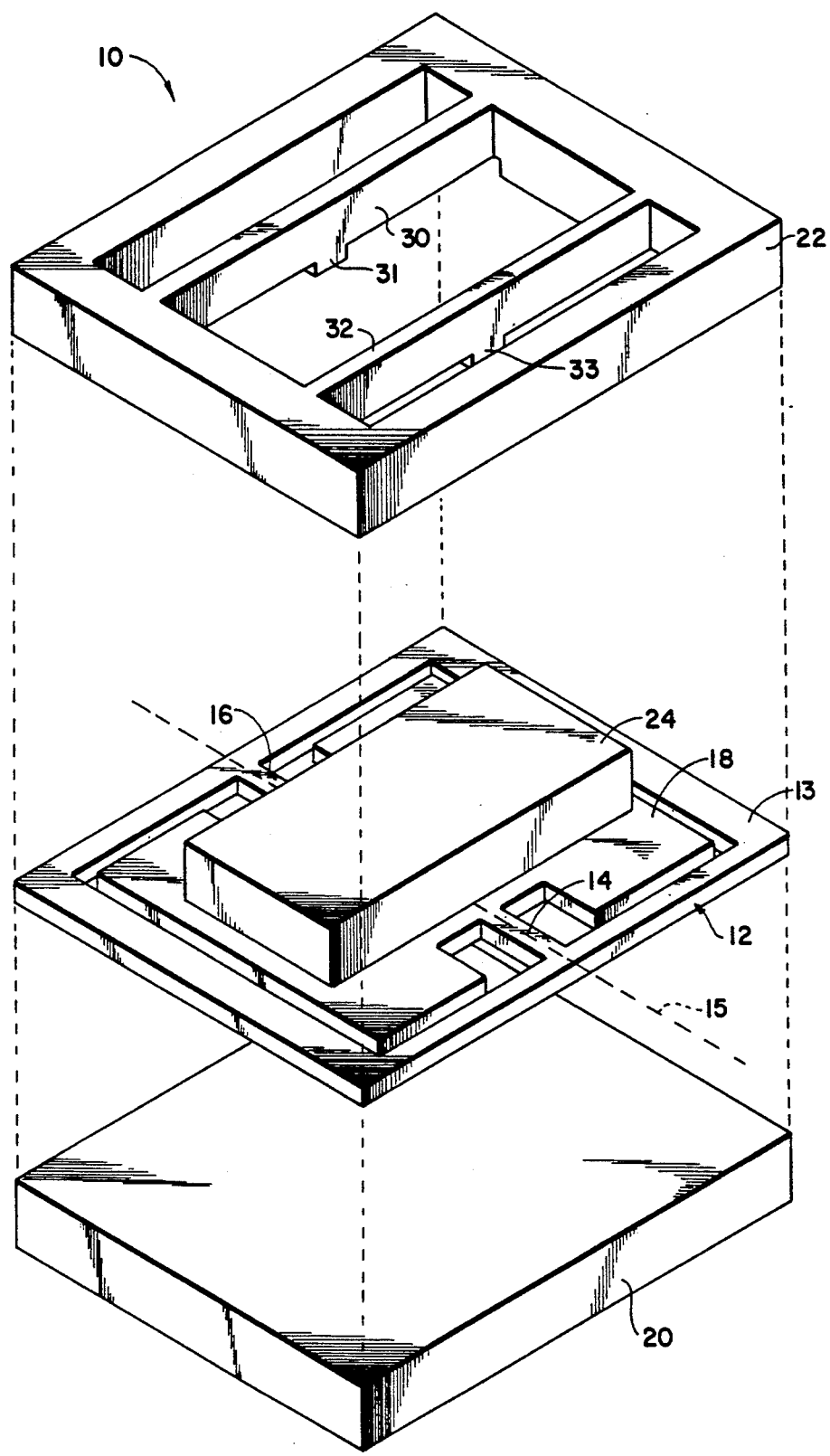
FIG. 1A is an exploded, axonometric view of a quartz resonator accelerometer according to this invention.

There is shown in FIG. 1A accelerometer 10 according to this invention. Accelerometer 10 includes monolithic quartz sensing structure 12 having fabricated therein the active accelerometer elements, including support frame 13 and proof mass support structure 18. Frame 13 and support structure 18 are interconnected by beam type resonator elements 14 and 16. Support structure 18 carries proof mass 24, which is typically a quartz element having the same crystallographic orientation as sensing element 12 and attached to support structure 18 during fabrication.

Resonator elements 14 and 16 comprising the resonator structure are elongated beam resonators axially aligned along common axis 15. The electrodes are not shown for clarity. Resonators 14 and 16 are used to measure the acceleration of proof mass 24 in the direction of axis 15 as is more fully described below.

Sensing structure 12 is sandwiched between identical support plates 20 and 22, which are preferably made from quartz having the same crystallographic orientation as sensing structure 12. Support plate 22 includes beam-like hinge members 30 and 32 for isolating the sensed acceleration along axis 15. Hinges 30 and 32 include projections 31 and 33 which bear on support structure 18 close to the region where elements 16 and 14, respectively, join support structure 18. Along with complementary hinges in plate 20, hinges 30 and 32 clamp elements 16 and 14.

The perimeter of support plates 22 and 20 bear directly on frame 13 of sensing structure 12. Thus, frame 13 is circumferentially supported on both sides to rigidly hold sensing structure 12 in place. The combination of this rigid holding and hinges 30 and 32 isolate the sensed acceleration to accelerations along axis 15.

Accelerometer 10 includes only four separately fabricated parts; sensing structure 12, support plates 20 and 22, and proof mass 24. The parts are rigidly attached together by techniques such as diffusion bonding and glass adhesion. Plates 20 and 22 may be approximately 40 thousandths of an inch thick and 0.8 inches long by 0.65 inches wide. Sensing structure 12 may be a three thousandths of an inch thick wafer having the same dimensions as support plates 20 and 22. Thus, the entire accelerometer is less than one tenth of an inch thick.

The support plate hinges, for example, hinges 30 and 32, preferably have a height to thickness ratio of approximately 10:1 to provide the necessary rigidity while not impeding the detection of acceleration of proof mass 24 in the direction of axis 15. Sensing elements 14 and 16 preferably have a length to width ratio of between 10 and 40:1 to provide the proper piezoelectric effect and force-frequency response.

By fabricating the active accelerometer elements, all found in sensing structure 12, from a single quartz wafer, many of the problems inherent in existing accelerometers are solved. First, the sensing structure is fabricated by photolithographic and plating techniques and directional etching. These fabrication techniques allow all of the elements to be formed from a single wafer while still retaining the small sizes and tolerances required for an accelerometer with the necessary precision and reliability. The monolithic nature of the sensing structure also removes the problems inherent with the precise fabrication and assembly of the separate pieces of the prior art accelerometers, as well as the temperature sensitivity created by the use of materials with different coefficients of thermal expansion. Thus, not only is the accelerometer of this invention more accurate and reliable, but the monolithic nature of the sensing element greatly reduces the fabrication time and expense.

Accelerometer 10 is preferably fabricated entirely of quartz cut from a single crystal. If the wafers used to fabricate the accelerometer elements are cut within approximately plus or minus 10° from the Z axis, highly directional etching may be accomplished with buffered hydrofluoric acid. With that crystal alignment, the Z axis etch rate is twenty to a hundred times greater than the X or Y axis etch rate; accordingly, the complex, well defined shapes of the structures of accelerometer 10 can be readily fabricated.

Figure 1B:
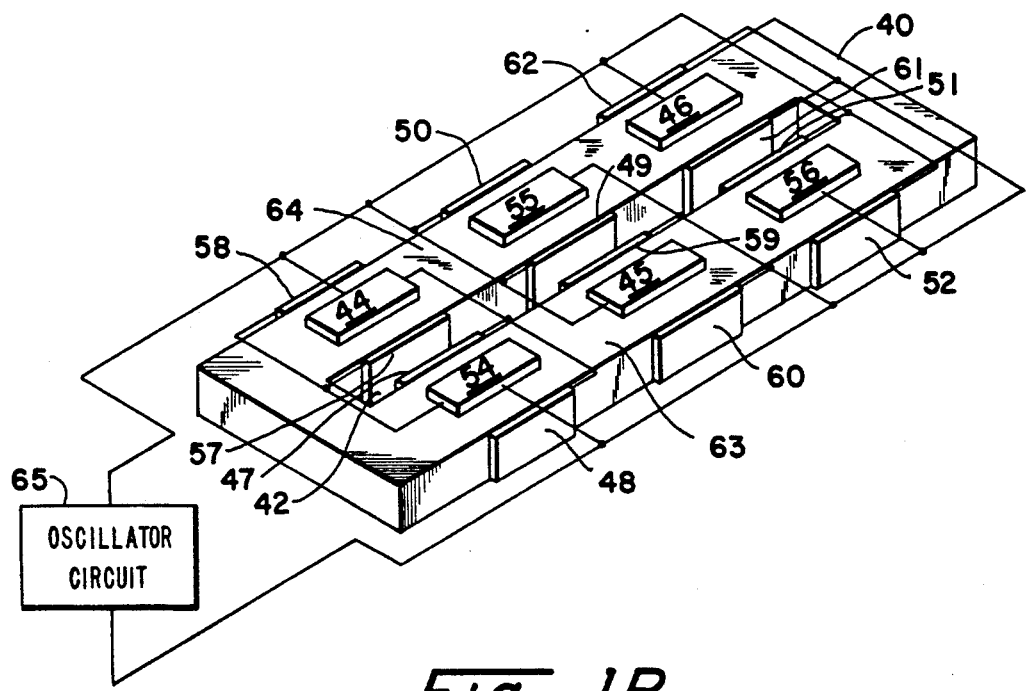
FIG. 1B is a simplified axonometric view of one type of resonator useful in the accelerometer of FIG. 1A.

Although accelerometer 10 is shown with a pair, 14 and 16, of single beam transducer elements aligned along axis 15, this is not a necessary limitation of the invention. Double tuning fork resonator structure 40, FIG. 1B, may be used in place of elements 14 and/or 16. The double tuning fork is created by forming slot 42 in the center of structure 40 to form elements 63 and 64 connected at either end. Elements 63 and 64 are vibrated by oscillator circuit 65 through first electrode set 44 through 52 and second electrode set 54–62. This is but one of the many possible electrode configurations to properly energize double tuning fork resonator 40 as one skilled in the art would recognize.

Figure 1C:
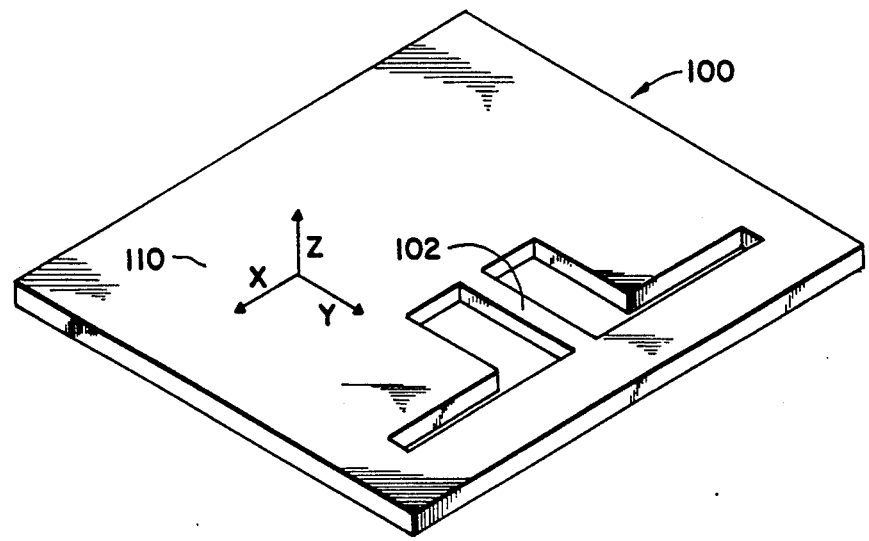
FIG. 1C is an axonometric view of an alternative to the sensing structure of the accelerometer of FIG. 1A.

An alternative to sensing structure 12, FIG. 1, is sensing structure 100, FIG. 1C, which includes a single elongated beam resonator structure 102, shown without the electrodes for the sake of clarity. As one skilled in the art will recognize, sensing structure 100 could replace structure 12, FIG. 1A.

Coordinate axis set 110 illustrates the preferred crystallographic orientation of the accelerometer sensing structure according to this invention; for example structures 100 and 12. Structure 100 lies in the X-Y plane, normal to the Z axis. Resonator 102 is aligned with the Y axis for temperature insensitivity.

To allow the anisotropic etching necessary to create the minute accelerometer elements from single quartz wafers, the wafers should be cut within approximately plus or minus 10° from the Z axis. Preferably, the sensing structure, the two support plates, and possibly even the proof mass are all taken from parallel cuts made through a single quartz crystal. This insures that the entire accelerometer has the exact same crystallographic orientation so that there are no effects created by temperature changes. The assembled accelerometer, for example accelerometer 10, FIG. 1A, thus resembles a structure carved from a single quartz crystal.

Figure 1D:
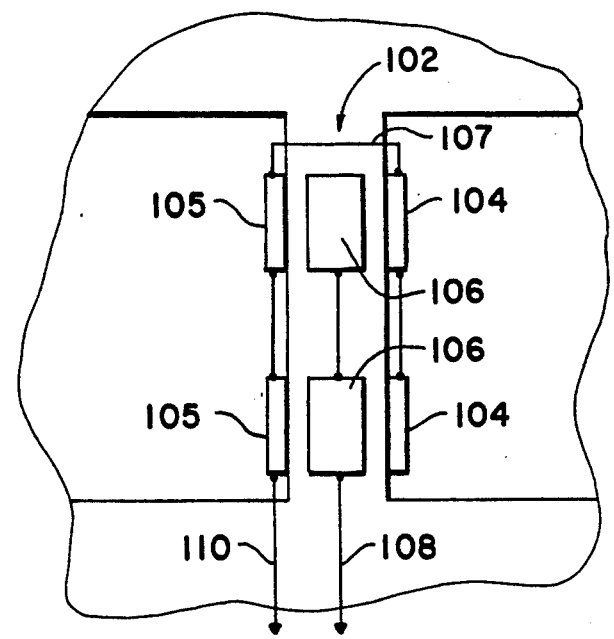
FIG. 1D is a simplified top plan view of the sensing structure of FIG. 1C.

One way of applying electrodes to a single beam resonator structure is shown in FIG. 1D. Resonator structure 102 has deposited on its upper surface electrode set 106 attached to an oscillator circuit, not shown, through wire 108. Electrode sets 104 and 105 are deposited on the sides of structure 102 and are electrically interconnected as depicted by lead 107. Electrodes 104 and 105 are also connected to the oscillator circuit, not shown, through wire 110.

Figure 1E:
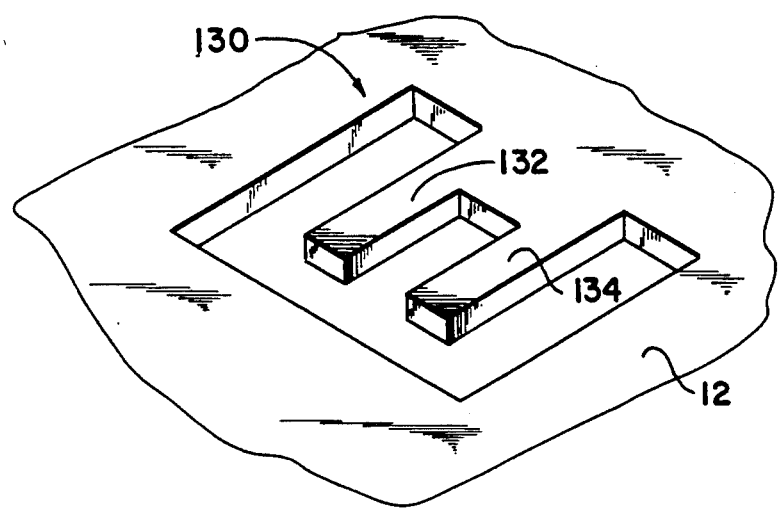
FIG. 1E is a greatly enlarged, axonometric view of a temperature sensing element for the accelerometer of FIG. 1A.

FIG. 1E shows in detail a double tuning fork temperature sensor 130 formed directly into sensing structure 12, FIG. 1A. Temperature sensor 130 was not shown in FIG. 1A for the sake of clarity. However, it is preferably formed close to element 14 and/or 16. Temperature sensor 130 includes resonator elements 132 and 134 parallel to the X axis for greatest temperature sensitivity and attached at only one end to sensing structure 12. Resonators 132 and 134 include electrodes, not shown, for harmonic frequency vibration. By detecting the change in vibration frequency of elements 132 and 134, the temperature of sensing structure 12 can be accurately determined for correcting the sensed acceleration for temperature effects. A second identical temperature sensor may be included; one close to each resonator 14 and 16, FIG. 1A. to correct for minute temperature differences within structure 12. Alternatively, separate temperature sensors could be placed proximate sensing structure 12, FIG. 1A, to detect the temperature of that structure.

Figure 2:
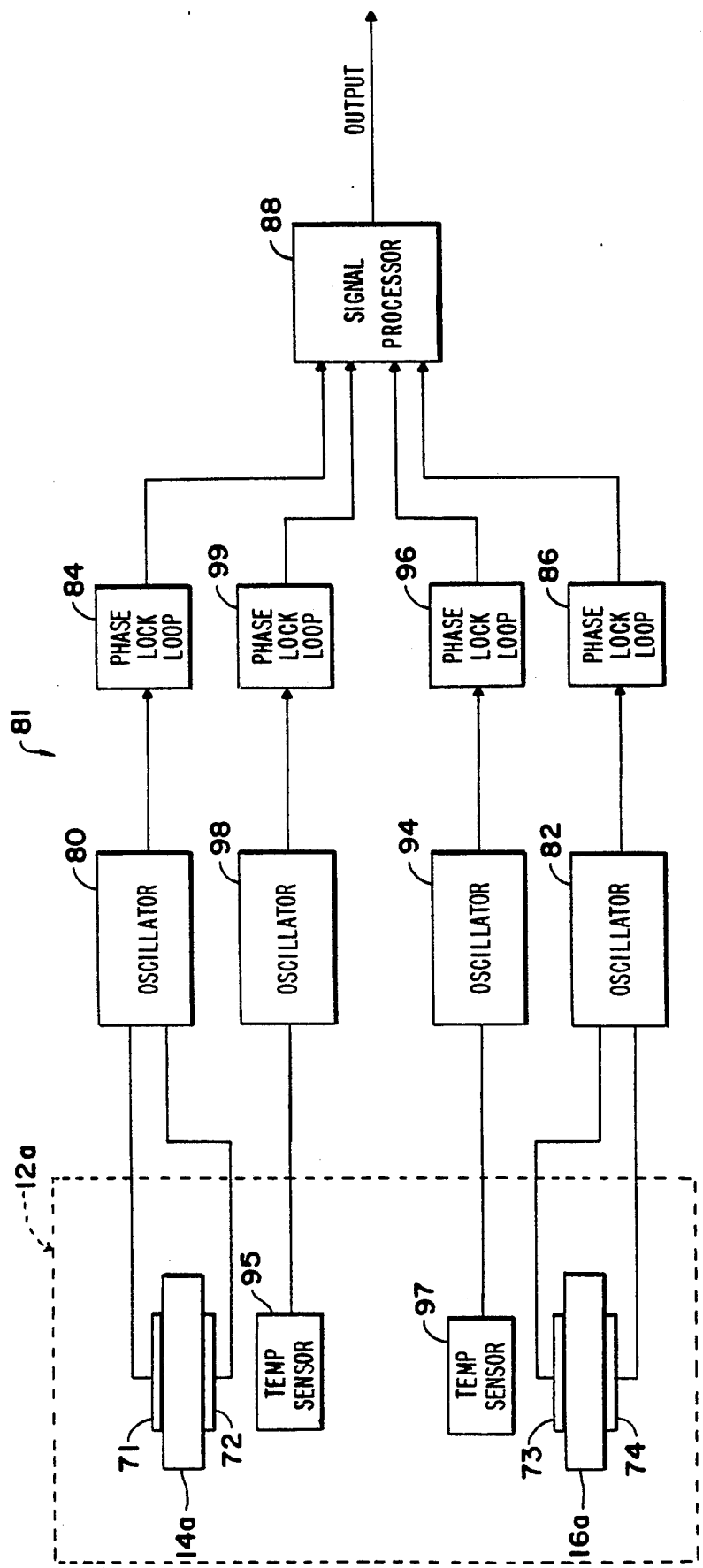
FIG. 2 is a simplified block diagram of the active accelerometer elements and the circuitry for resolving acceleration of the accelerometer of FIG. 1A.

Circuit 81 for operating the accelerometer according to this invention, and calculating the acceleration of the proof mass, is shown in FIG. 2. Sensing structure 12a includes resonator structures 14a and 16a. Resonator structure 14a has electrode sets 71 and 72, shown in schematic form, which are responsive to oscillator circuit 80. Resonator structure 16a has electrode sets 73 and 74, shown schematically, responsive to oscillator circuit 82. Temperature sensors 95 and 97 are proximate resonator structures 14a and 16a, respectively, and are responsive to oscillators 98 and 94, respectively.

Oscillators 80, 82, 94 and 98 may include Pierce oscillator circuits that are well known in the art. The oscillator circuits are essentially feedback circuits that drive the piezoelectric elements at their harmonic frequencies. The frequency of force sensing resonator elements 14a and 16a changes with applied force; the resonant frequency increases with tensile force and decreases with compressive force. As the force on the resonator structures changes, the oscillator circuit adjusts the electric fields to maintain oscillation at the harmonic frequency. The oscillator circuits also resolve that frequency for further processing.

The output of oscillator circuits 80 and 82 is a square wave with a frequency related to the acceleration of proof mass 24, FIG. 1A, that is fed to digital phase lock loop circuits 84 and 86, respectively. The signal fed to phase lock loops 96 and 99 from oscillators 94 and 98 are square waves with a frequency related to the temperature of sensing structure 12.

The outputs of circuits 84 and 86 represent the oscillation frequencies of resonators 14a and 16a, respectively; the acceleration of the proof mass is directly related to the difference in those frequencies. The output of circuits 96 and 99 represents the temperature of structure 12a, and so of resonators 14a and 16a. Signal processor 88, which may be a microprocessor circuit, performs compensation and filtering algorithms for creating an output signal representative of temperature-corrected acceleration. The signal may be used as desired, for example by an onboard navigation computer.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A monolithic quartz resonator accelerometer comprising:
   a monolithic quartz sensing structure including: a frame;
   a resonator structure connected to said frame; and
   a proof mass support structure within said frame and supported by said resonator structure;
   a proof mass fixed to said support structure; and
   electrode means on said resonator structure for driving said resonator structure at a vibration frequency which varies as a function of the acceleration of said proof mass.

2. The accelerometer of claim 1 further including quartz support means for securing said sensing structure.

3. The accelerometer of claim 2 in which said support means includes two support plates encompassing said frame.

4. The acceleromater of claim 3 in which said support plates are fixed to said frame.

5. The accelerometer of claim 3 in which said support plates include means for clamping said resonator structure proximate said support structure.

6. The accelerometer of claim 2 in which said support means has the same crystallographic orientation as said monolithic quartz sensing structure.

7. The accelerometer of claim 1 further including means for energizing said electrode means to vibrate said resonator structure.

8. The accelerometer of claim 7 in which said means for energizing includes means for establishing the vibration frequency of said resonator.

9. The accelerometer of claim 8 further including means, responsive to said means for establishing, for determining the acceleration of said proof mass.

10. The accelerometer of claim 9 in which said means for determining includes means for calculating the change in vibration frequency of said resonator as said proof mass is accelerated.

11. The accelerometer of claim 9 further including means for sensing the temperature of said quartz sensing structure.

12. The accelerometer of claim 11 in which said quartz sensing structure is integral with said means for sensing temperature.

13. The accelerometer of claim 11 in which said means for sensing temperature includes a temperature-sensitive resonator structure and means for vibrating said temperature-sensitive resonator structure.

14. The accelerometer of claim 13 in which said means for sensing temperature further includes means for resolving the vibration frequency of said temperature-sensitive resonator structure.

15. The accelerometer of claim 14 in which said means for determining the acceleration of said proof mass is responsive to said means for resolving for determining a temperature-corrected acceleration.

16. The accelerometer of claim 1 in which said proof mass includes a quartz member having the same crystallographic orientation as said monolithic quartz sensing structure.

17. The accelerometer of claim 1 in which said resonator structure includes two resonator elements aligned along a common longitudinal axis.

18. The accelerometer of claim 1 in which said resonator structure includes an elongated beam member.

19. The accelerometer of claim 18 in which said elongated member includes a double tuning fork structure.

20. The accelerometer of claim 1 in which said monolithic quartz sensing structure is rotated less than 10 degrees from the quartz Z axis.

21. A monolithic quartz resonator accelerometer, comprising:
   a monolithic quartz sensing structure including:
      a frame;
      a proof mass support structure within said frame; and
      a pair of axially aligned elongated beam resonator structures interconnecting said frame and said support structure;
   a proof mass fixed to said support structure;
   a first quartz support plate on one side of said sensing structure and a second quartz support plate on the opposite side of said sensing structure for securing said sensing structure, said support plates having the same crystallographic orientation as said sensing structure;
   at least one of said support plates having hinge means projecting toward said sensing structure proximate said resonator structures for clamping said resonator structures proximate said support structure;
   electrode means on said resonator structures;
   means for energizing said electrode means to vibrate said resonator structures at a frequency dependent on the force applied to said resonator structures along said alignment axis;
   means, responsive to said means for energizing, for determining the difference in vibration frequency of said resonator structures; and
   means, responsive to said means for determining, for establishing the acceleration of said proof mass in the direction of said alignment axis.

* * * * *